Oct. 10, 1961     L. N. HAVENER     3,003,735
SUSPENSION CLIP
Filed June 21, 1960
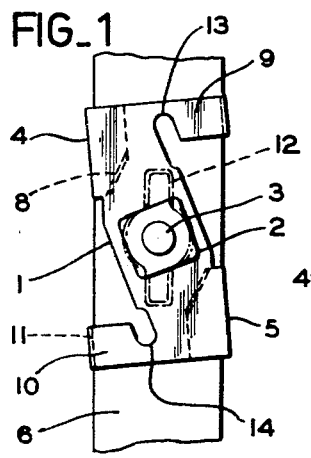
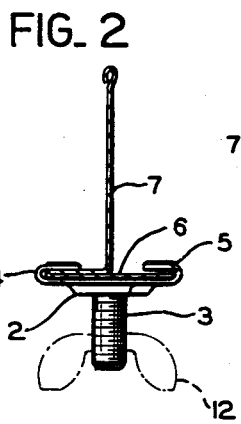
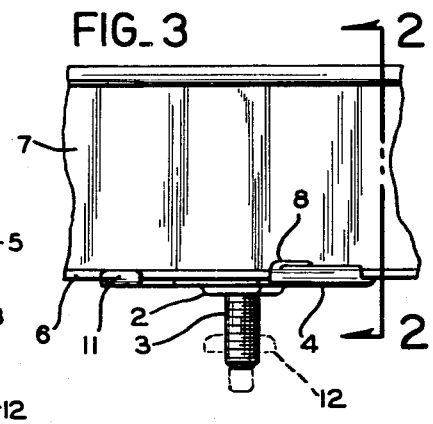
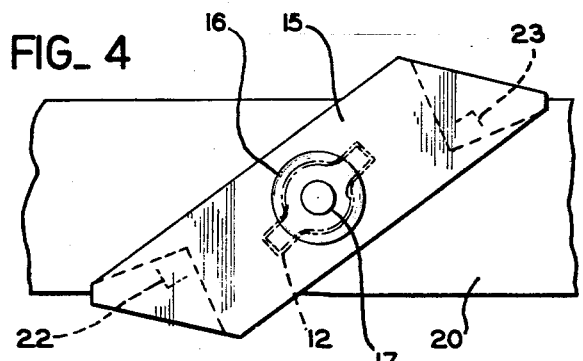
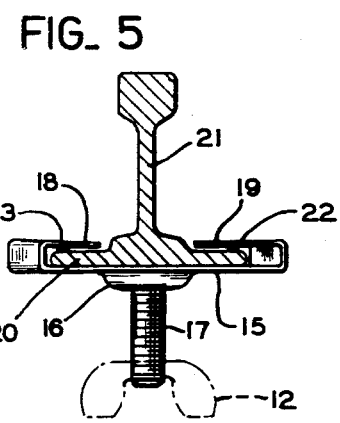
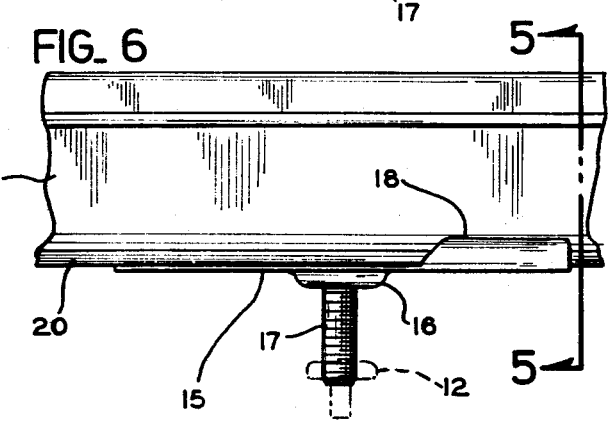
INVENTOR.
LESLIE N. HAVENER
BY
Oberlin, Maky & Donnelly
ATTORNEYS United States Patent Office 3,003,735
Patented Oct. 10, 1961

3,003,735
SUSPENSION CLIP
Leslie N. Havener, Euclid, Ohio, assignor to Erico Products, Inc., Cleveland, Ohio, a corporation of Ohio
Filed June 21, 1960, Ser. No. 37,792
6 Claims. (Cl. 248—228)

This invention relates as indicated to a novel suspension clip, and more particularly to a clip adapted to suspend and support a variety of articles from I-beams, struts and the like.

In modern building construction, there has been rapidly increasing employment of suspended ceilings which may, for example, support expanded metal lath to be plastered or appropriate elongated beams adapted to support batts of sound insulating material. A variety of articles and fixtures such as fluorescent lighting fixtures, for example, frequently require to be mounted on or suspended from these beams or struts, and it is a principal object of this invention to provide attaching means in the form of a suspension clip which may be readily manually installed at any selected point along the length of such a supporting member.

Another object is to provide such clip having a projecting threaded stud to which the fixture or the like may be secured as by means of a wing nut, for example.

A further object is to provide such suspension clip which, while easily manually installed, will thereupon nevertheless automatically firmly engage and grip the supporting member and will not inadvertently become detached therefrom.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a plan view of a form of suspension clip embodying the principles of this invention, shown mounted on a sheet metal I-beam;

FIG. 2 is an end elevational view of such clip showing such beam in section;

FIG. 3 is a side elevational view of the clip of FIGS. 1 and 2;

FIG. 4 is a plan (bottom) view of a modified form of suspension clip;

FIG. 5 is an end view of the FIG. 4 clip showing the I-beam on which it is mounted in cross-section; and FIG. 6 is a side elevational view of such beam with the clip of FIGS. 4 and 5 installed thereon.

Referring now to such drawing and especially FIGS. 1–3 inclusive thereof, the embodiment of the invention there illustrated comprises a sheet metal clip, preferably of spring steel, having a diagonal central body portion 1 having a square outwardly embossed center portion 2 adapted to receive the head of a short bolt or stud 3 and hold the same against rotation. The head of the bolt may also be upset, if desired, to lock the same to the clip in a unitary manner. Diagonally opposite corner portions of the clip are formed by flanges 4 and 5 which are folded over parallel to the flat body portion 1 in order closely to embace the respective side edge portions of the transverse web 6 of I-beam 7. The inner corners such as 8 of such flanges 4 and 5 may desirably be slightly turned up so that such flanges 4 and 5 will ride over the side edges of web 6 more easily when the clip is rotated to achieve this end.

Side arm portions 9 and 10 opposite such folded corner portions 4 and 5 respectively are provided with upturned ends such as 11 which engage but do not overlie transverse web 6 when the clip is mounted thereon. It will thus be seen that the clip of this invention as shown in FIGS. 1–3 inclusive may very quickly be mounted upon a strip or web portion such as 6 having parallel edges spaced apart a distance equal to the width of the clip between the upturned flanges of the latter. The clip will first be placed flatwise against such web and turned or rotated about the axis defined by stud 3 to bring the inwardly folded edge portions 4 and 5 into web edge clamping position as shown in FIG. 1. During this movement, the upturned arm end portions such as 11 will ride across the surface of web 6 and will snap up into web edge embracing position (see FIGS. 2 and 3) when the clip has been rotated to the full extent possible. In this position, such upstanding arm end portions serve to prevent any reverse rotation of the clip and thereby maintain the diagonally opposite inwardly folded corner portions or tabs 4 and 5 in firm clamping position. A light fixture or any other appropriate article may now be secured to and suspended from depending stud 3 as by means of wing nut 12, for example.

Suspension clips of the type just described are conveniently and cheaply manufactured from relatively thin gauge but resiliently rigid spring steel strip and may be quickly put in place at any desired point along the supporting member, by merely manually twisting the same to force tabs 4 and 5 into place. If it should subsequently be desired to remove the spring clip, this may readily be accomplished by first prying up the arms 9 and 10 as with a screwdriver and then rotating the clip to disengage the clamping tabs 4 and 5. Arms 9 and 10 are attenuated as at 13 and 14, preferably on a radius, to facilitate resiliently bending the same when rotating the clip either to attach the same to the supporting web or to disengage the same therefrom.

Now referring more specifically to FIGS. 4–6 inclusive of the drawing, the embodiment of the invention there illustrated comprises a relatively simple and inexpensive form of clip which may likewise be of spring steel and consist of a rectangular body portion 15 deformed or embossed in its longitudinal central region 16 to receive the head of bolt or stud 17. Diagonally opposite corner portions 18 and 19 of the strip 15 are folded over into a plane substantially parallel to the plane of the main body portion 15 and spaced from the latter a distance to permit insertion of the transverse web 20 of I-beam 21, for example. Prongs or detents 22 and 23 may be struck down from such corner portions frictionally to engage the upper surface of transverse web 20 so that when the clip has been rotated about the axis of stud 17 to cause the respective corner portions 18 and 19 to overlie web 20 to the extent possible, such prongs or detents 22 and 23 will firmly and resiliently grip and bite into the surface of web 20 and prevent inadvertent loosening of the clip. The clip may, however, be removed when desired as by means of a hammer and screwdriver, a few taps on such folded corner portions sufficing to pivot the same to disengage the detents.

In view of the foregoing, it will be seen that there has been provided a simple and inexpensive form of suspension clip which is nevertheless strong and secure when put in place and which will not inadvertently come loose when once installed.

While the FIGS. 4–6 embodiment does not include the positive latch means of the FIGS. 1–3 embodiment (e.g. the upturned lip 11), it has the advantage of being adaptable for installation on quite a wide range of beams or supports of varying widths, with the stud 17 always being located exactly centrally of such beam regardless of the width of the latter. It will be appreciated that detents such as 22 and 23 may be provided on the body portion 15 opposed to the folded tabs 18 and 19 if desired. As in the case of the FIG. 1 embodiment, the lines of folds of such tabs are generally parallel to one another and longitudinally offset on opposite sides of the body portion to render them effective to grip the supporting beam or like member when the clip is rotated flatwise with relation thereto.

Other modes of applying the principle of the invention may be employed, change being made as regards the details described, provided the features stated in any of the following claims or the equivalent of such be employed.

I therefore particularly point out and distinctly claim as my invention:

1. A suspension clip comprising a body portion of flat resilient sheet material, means on said clip for supporting a depending article therefrom, tabs folded over parallel to said body portion and to the same side thereof along generally parallel lines of folding, said tabs being offset longitudinally of said clip and at opposite side edges thereof to enable them to embrace respective edge portions of a supporting beam or like member when said clip is rotated flatwise, and resilient arms extending from said body portion generally opposite said respective tabs having end portions offset to the same side as said tabs to snap over the corresponding edges of such beam when said clip is thus rotated and thereby prevent inadvertent dislocation of said clip.

2. The clip of claim 1, wherein said supporting means is a threaded stud.

3. The clip of claim 1, wherein said arms are narrowed adjacent said body portion to facilitate flexing of the same during installation.

4. The clip of claim 1, wherein the inner edge portions of said tabs are recurved to facilitate sliding action across the opposed surface of such beam.

5. A suspension clip comprising a body portion of flat resilient material, means on said clip for supporting a depending article therefrom, tabs on said body portion projecting inwardly from adjacent the opposite edges thereof and lying in a plane offset from and parallel to the plane of said body portion on the same side thereof, said tabs also being offset relative to each other longitudinally of said clip to enable them to embrace respective edge portions of a supporting beam or like member when said clip is rotated flatwise, the portions of said clip generally opposite said respective tabs being offset to the same side of said body portion as said tabs resiliently to snap over the corresponding edges of such beam when said clip is thus rotated and thereby prevent inadvertent dislocation of said clip.

6. As a new article of manufacture, a unitary, one-piece flat sheet metal elongated clip having straight parallel side edges and having a central portion adapted to support an article depending therefrom, diagonally opposite corner portions of said clip being folded to the same side thereof along substantially parallel lines, each of said lines of folding being diagonal to said side edges of said clip but intersecting only one of said side edges, said corner portions lying in a single plane parallel to the body of said clip to enable them to embrace respective edge portions of a supporting beam or like member when said clip is rotated flatwise in engagement therewith, and gripping means on said clip comprising beam engaging detents on said folded corner portions close to the extreme corner angles thereof adapted to engage such beam to prevent inadvertent counter-rotation of said clip after installation of the latter.

References Cited in the file of this patent

UNITED STATES PATENTS

| | | |
|---|---|---|
| 710,153 | Jaques | Sept. 30, 1902 |
| 1,094,496 | Tuite | Apr. 28, 1914 |
| 1,808,628 | Bond | June 2, 1931 |
| 2,686,033 | Keiter | Aug. 10, 1954 |
| 2,868,490 | Price | Jan. 13, 1959 |

FOREIGN PATENTS

| | | |
|---|---|---|
| 508,587 | France | Oct. 15, 1920 |